United States Patent
Nakahara et al.

(10) Patent No.: US 8,580,433 B2
(45) Date of Patent: Nov. 12, 2013

(54) TITANIUM OXIDE-BASED COMPOUND FOR ELECTRODE AND LITHIUM SECONDARY BATTERY USING THE SAME

(75) Inventors: Kiyoshi Nakahara, Ube (JP); Nobuyuki Hashimoto, Ube (JP); Toshimasa Seki, Ube (JP)

(73) Assignee: Titan Kogyo Kabushiki Kaisha, Yamaguchi (JP)

( * ) Notice: Subject to any disclaimer, the term of this patent is extended or adjusted under 35 U.S.C. 154(b) by 246 days.

(21) Appl. No.: 13/032,758

(22) Filed: Feb. 23, 2011

(65) Prior Publication Data

US 2011/0206991 A1    Aug. 25, 2011

(30) Foreign Application Priority Data

Feb. 25, 2010 (JP) ................. 2010-039774

(51) Int. Cl.
*H01M 4/13* (2010.01)
(52) U.S. Cl.
USPC .............. 429/218.1; 429/231.5; 429/231.95; 429/251
(58) Field of Classification Search
USPC ............ 429/218.1, 231.5, 231.95, 251
See application file for complete search history.

(56) References Cited

U.S. PATENT DOCUMENTS

| | | | |
|---|---|---|---|
| 6,524,750 B1 * | 2/2003 | Mansuetto | 429/232 |
| 2007/0231693 A1 * | 10/2007 | Inagaki et al. | 429/231.1 |
| 2007/0292760 A1 | 12/2007 | Patoux et al. | |

FOREIGN PATENT DOCUMENTS

| | | | | |
|---|---|---|---|---|
| JP | 2008034368 A | | 2/2008 | |
| JP | 2008-117625 | * | 5/2008 | ............ H01M 4/48 |
| JP | 2008117625 A | | 5/2008 | |

OTHER PUBLICATIONS

A.R. Armstrong, G. Armstrong, J. Canales, R. Garcia and P.G. Bruce, Lithium-Ion Intercalation into TiO2-B Nanowires, Advanced Materials 2005, vol. 17, No. 7, pp. 862-865 Wiley-VCH Verlag GmbH & Co., Weinheim, Germany.

* cited by examiner

*Primary Examiner* — Patrick Ryan
*Assistant Examiner* — Ben Lewis
(74) *Attorney, Agent, or Firm* — McNees Wallace & Nurick LLC

(57) ABSTRACT

The present invention provides a novel titanium-based composite oxide being usable as an electrode material for a lithium secondary battery and having a high capacity and an excellent cycle stability, a method for producing the same and a lithium secondary battery using the titanium-based composite oxide. Disclosed is a compound obtained by compositing titanium oxide with elements other than titanium, specifically a titanium-based composite oxide wherein the relevant chemical formula is $Ti_{(1-x)}M_xO_y$, M is the element Nb or the element P, or a combination of these two elements in an optional ratio therebetween, x is such that $0<x<0.17$, y is such that $1.8 \leq y \leq 2.1$, x is the sum of Nb and P when M is a combination of the element Nb and the element P, and the present invention provides a lithium secondary battery using as an electrode the titanium-based composite oxide.

7 Claims, 7 Drawing Sheets

TITANIUM OXIDE-BASED COMPOUND FOR ELECTRODE AND LITHIUM SECONDARY BATTERY USING THE SAME

BACKGROUND OF THE INVENTION

1. Field of the Invention

The present invention relates to a novel titanium-based composite oxide useful as an active material of a lithium second battery and a lithium secondary battery using the same.

2. Description of the Related Art

Lithium secondary batteries have progressed as electric power supplies for cellular phones and laptop computers because the energy densities of lithium secondary batteries are high; however, with the miniaturization and achievement of lightweightness of portable terminal devices ascribable to the recent progress of IT technology, batteries as the electric power supplies of such devices have come to be required to be further reduced in size and to be higher in capacity. Additionally, in a manner making the most of the high energy densities of lithium secondary batteries, lithium secondary batteries come to attract attention as electric power supplies for use in electric automobiles and hybrid automobiles and as power storage-type power supplies.

With respect to the negative electrode materials of lithium batteries, carbon-based negative electrodes have hitherto been commonly used; the lithium secondary batteries using carbon-based negative electrodes are characterized in that the voltage and the energy density at the time of discharge are high. However, because the potential of the negative electrode is low, when rapid charge is performed, lithium metal is deposited to increase the risk of causing internal short circuiting, and further, there is an inherent risk such that such internal short circuiting leads to the occurrence of flame. Accordingly, there have been investigated lithium batteries in which although the energy density is decreased, the heat generation at the time of internal short circuiting is reduced by using a high-potential negative electrode, and further by suppressing the decomposition of the electrolyte, the safety is enhanced and the operation life is extended. Among others, $Li_4Ti_5O_{12}$ has a potential of 1.5 V with reference to lithium, is free from the volume change at the time of charge/discharge and is extremely satisfactory in cycle properties, and hence coin batteries using $Li_4Ti_5O_{12}$ have been put into practical use.

However, the theoretical capacity of $Li_4Ti_5O_{12}$ is 175 mAh/g, which leads to a drawback such that the electric capacity of $Li_4Ti_5O_{12}$ is as small as approximately half the electric capacity of carbon, which is commonly used as a negative electrode material, and the energy densities of lithium secondary batteries using $Li_4Ti_5O_{12}$ are also small. Therefore, from the viewpoint of the safety and long operating life, a negative electrode material which has a potential of 1.0 to 1.5 V with reference to lithium and a large electric capacity has been demanded.

Under such circumstances, the titanium oxide obtained by using as a starting material $K_2Ti_4O_9$ or $Na_2Ti_3O_7$ having layered structure and by performing proton exchange and thermal dehydration is referred to as the bronze-structure titanium oxide or $TiO_2(B)$, and has a layered structure or a tunnel structure, and hence is attracting attention as an electrode material.

For example, although it has been found that a high charge/discharge capacity of 200 mAh/g or more is obtained by converting the bronze-structure titanium oxide compound into nanoparticles (A. R. Armstrong et al., ADVANCED MATERIALS, 2005, 17, No. 7, pp. 862 to 865), such a compound has a low bulk density and a large specific surface area, and hence the packing density of the electrode is low, the adhesion between the coating film and the current collector tends to be aggravated, and thus such a compound is not necessarily to be claimed as excellent as an active material. On the other hand, the bronze-structure titanium oxide of micron size, obtained by a solid phase method through $K_2Ti_4O_9$ or $Na_2Ti_3O_7$ is capable of being reduced in specific surface area and has a firm particle framework, and hence is satisfactory in cycle properties, but is disadvantageously small in charge/discharge capacity (Japanese Patent Laid-Open Nos. 2008-34368 and 2008-117625).

As described above, the electric capacities of conventional lithium secondary batteries are still insufficient, and hence negative electrode materials which are materials large in electric capacity and are capable of maintaining the capacities are demanded.

SUMMARY OF THE INVENTION

Accordingly, an object of the present invention is to produce a titanium-based compound which makes larger the electric capacity and improves the cycle properties in the lithium secondary battery using the titanium-based negative electrode material, and to provide a lithium secondary battery using the titanium-based compound.

For the purpose of achieving the above-described object, the present inventors made a continuous diligent study, and consequently obtained a titanium-based composite oxide containing niobium and/or phosphorus and having a tunnel structure or a layered structure, and have perfected the present invention by discovering that the lithium secondary battery using the titanium-based composite oxide as the battery electrode is excellent in safety, and displays a high charge/discharge capacity and an excellent cycle stability.

Specifically, the present invention provides a titanium-based composite oxide represented by a chemical formula $Ti_{(1-x)}M_xO_y$, wherein M is the element Nb or the element P, or a combination of these two elements in an optional ratio therebetween, x is such that 0<x<0.17, y is such that 1.8≤y≤2.1, x is the sum of the molar proportions of Nb and P when M is a combination of the element Nb and the element P, and a production method of the titanium-based composite oxide and a lithium secondary battery constituted with an electrode using as the active material the titanium-based composite oxide.

Additionally, the titanium-based composite oxide is a compound which has a tunnel structure or a layered structure, is monoclinic, belongs to the space group C2/m, and has a diffraction pattern based on the powder X-ray diffraction, corresponding to the bronze structure.

Additionally, the titanium-based composite oxide has a specific surface area falling preferably within a range from 5 to 50 m²/g.

Additionally, by using the titanium-based composite oxide as an active material, an electrode for a lithium battery can be formed.

Additionally, by using the electrode for a battery, a lithium secondary battery can be formed.

Further, it is possible to form a lithium secondary battery prepared by using the titanium-based composite oxide as an active material and Li metal as a counter electrode, wherein in a charge/discharge test conducted at 35 mA per 1 g of the active material, the initial discharge capacity is 210 mAh/g or more, the discharge capacity at the third cycle is 195 mAh/g or more, and the capacity retention rate at the 50th cycle relative to the third cycle is 95% or more.

The present invention provides a novel titanium-based composite oxide, and when the novel titanium-based composite oxide is adopted as the negative electrode of a lithium secondary battery, it comes to be possible to make the energy density large and to improve the cycle properties.

DETAILED DESCRIPTION OF THE PREFERRED EMBODIMENTS

Figure 1:
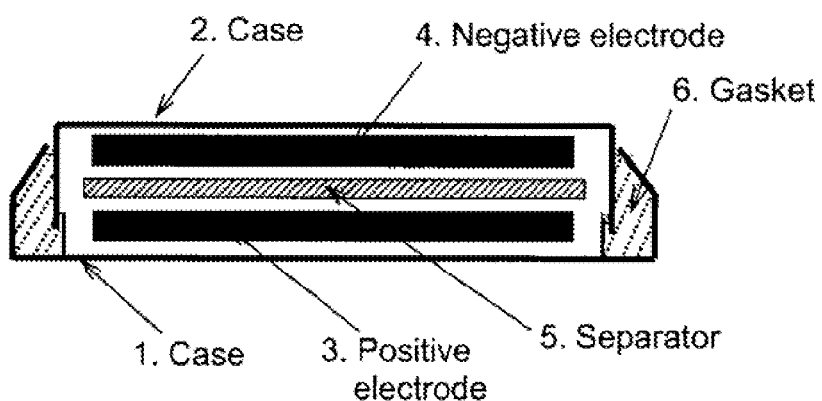
FIG. 1 is a schematic view illustrating a coin battery for which the battery evaluation was performed.
Figure 2:
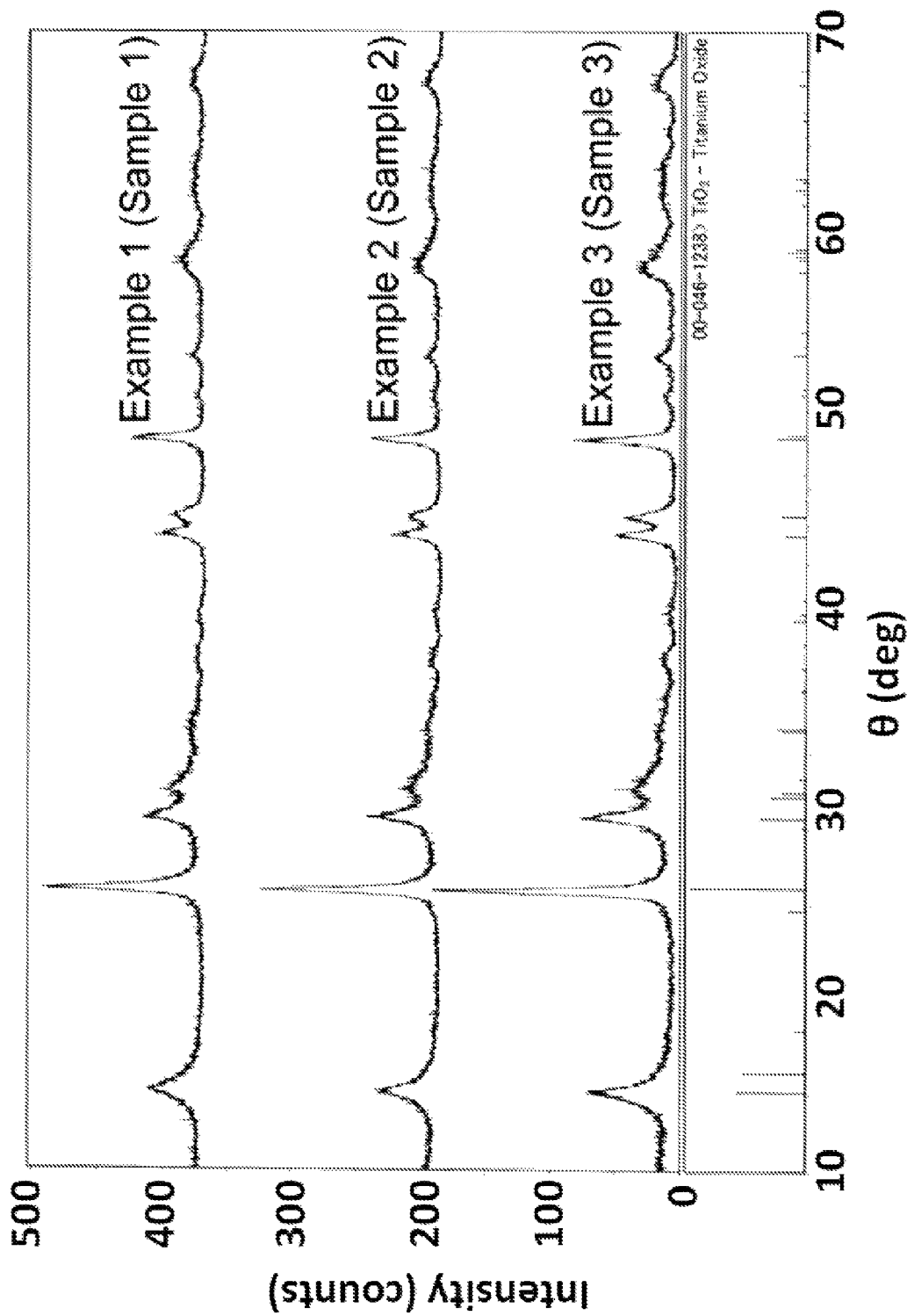
FIG. 2 is an X-ray diffraction chart of bronze-structure $Ti_{0.94}Nb_{0.06}O_{2.03}$ samples (Example 1, 2 and 3)
Figure 3:
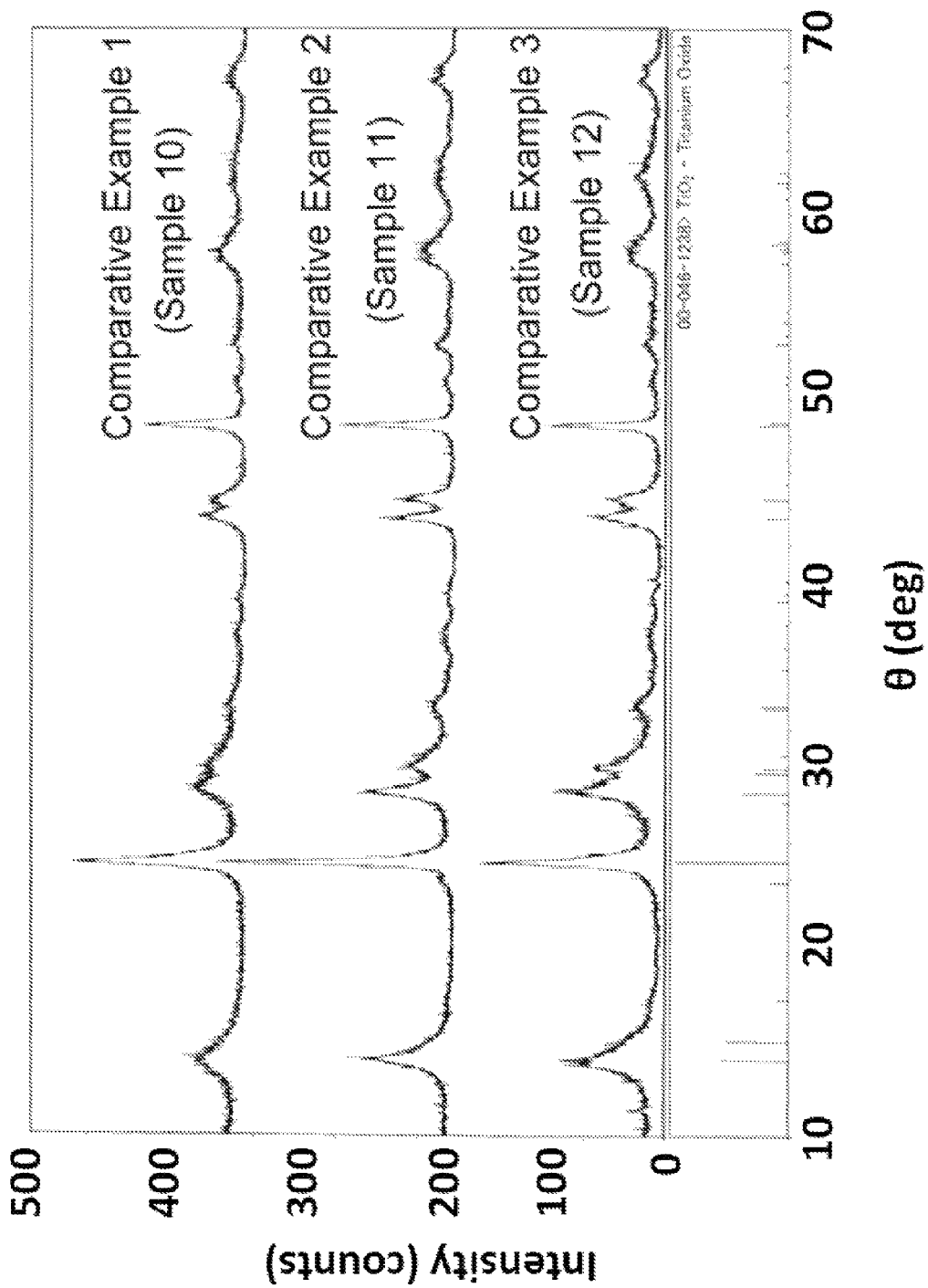
FIG. 3 is an X-ray diffraction chart of bronze-structure $TiO_2$ samples (Comparative Example 1, 2 and 3)
Figure 4:
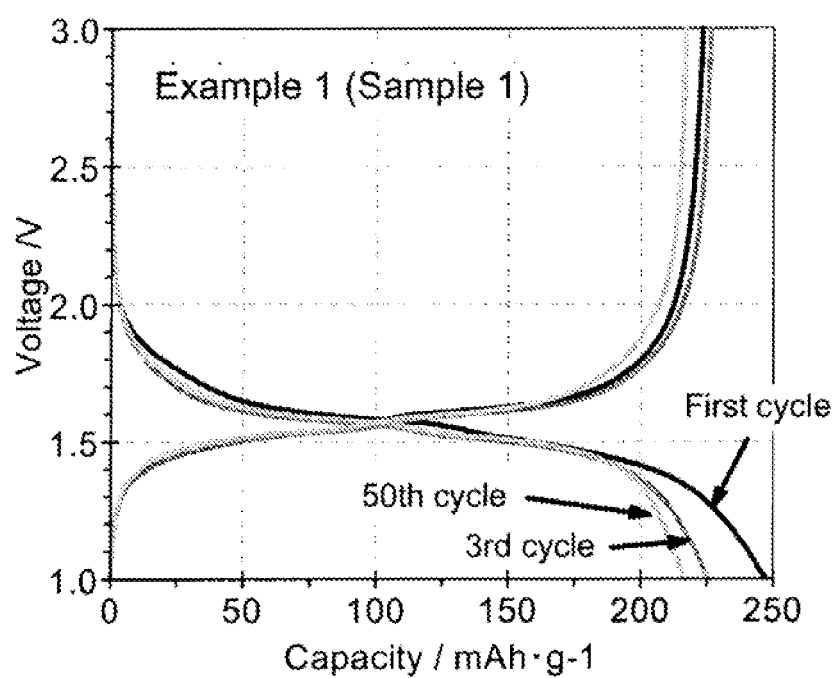
FIG. 4 shows the charge-discharge curves of Example 1 (Sample 1)
Figure 5:
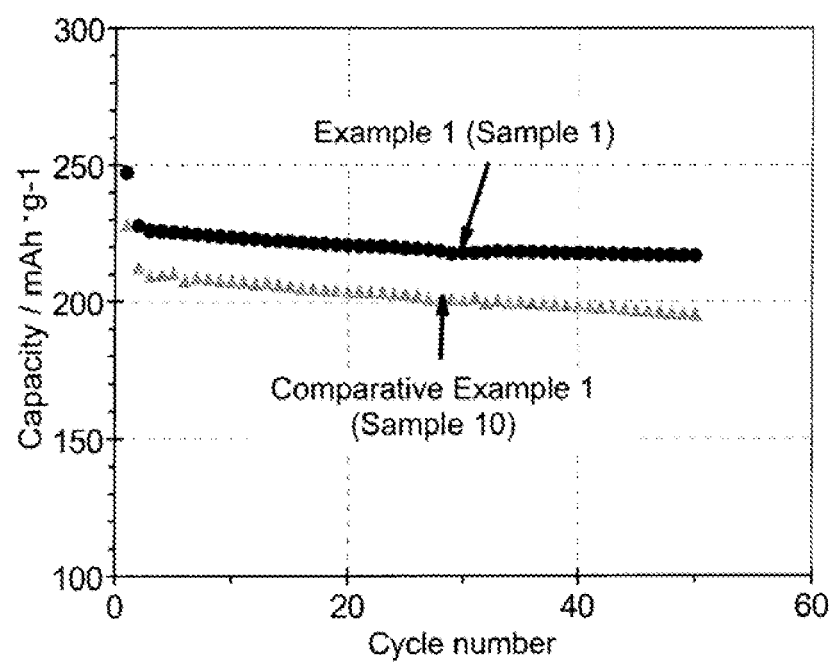
FIG. 5 is a graph showing the cycle properties of Example 1 and Comparative Example 1 (Samples 1 and 10)
Figure 6:
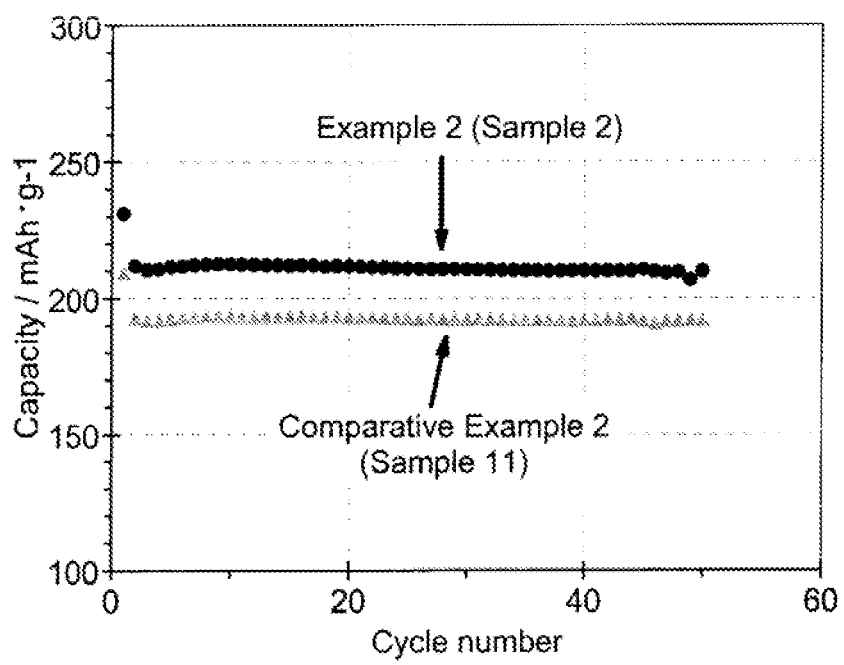
FIG. 6 is a graph showing the cycle properties of Example 2 and Comparative Example 2 (Samples 2 and 11)
Figure 7:
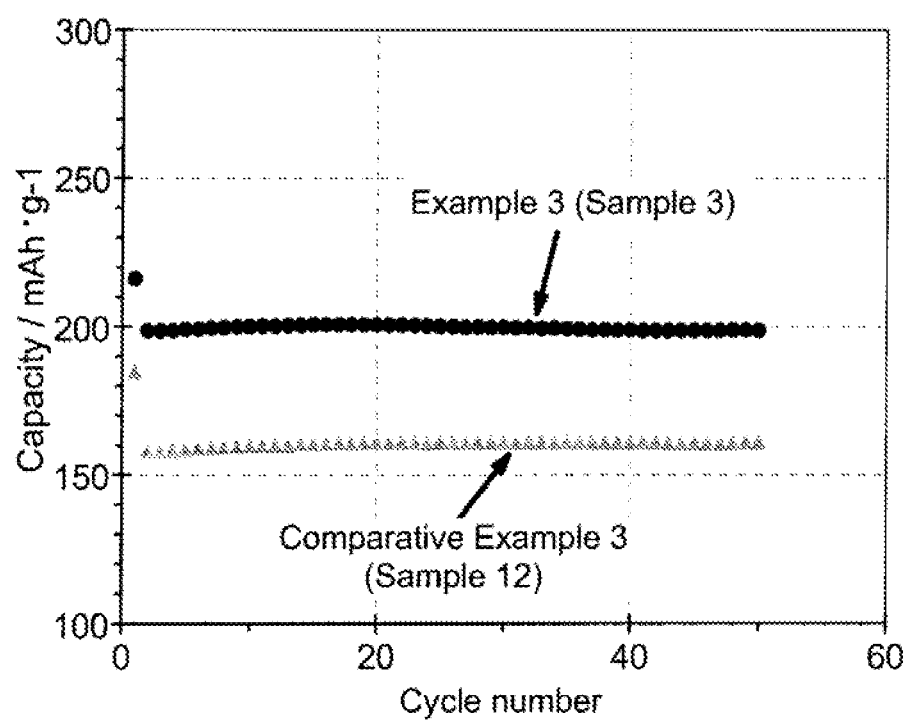
FIG. 7 is a graph showing the cycle properties of Example 3 and Comparative Example 3 (Samples 3 and 12).

The titanium-based composite oxide of the present invention is a compound represented by a chemical formula $Ti_{(1-x)}M_xO_y$, wherein M is the element Nb or the element P, or a combination of these two elements in an optional ratio therebetween, x is such that $0<x<0.17$, y is such that $1.8 \leq y \leq 2.1$, x is the sum of the molar proportions of Nb and P when M is a combination of the elements Nb and P. As the amount of niobium or phosphorus increases, the charge/discharge capacity increases; however, when x exceeds 0.17, conversely the decrease of the charge/discharge capacity is caused, and hence x is preferably such that $0<x \leq 0.15$. The content of niobium or phosphorus can be analyzed by using an X-ray fluorescence spectrometer on the basis of an FP (Fundamental Parameter) method, a calibration curve method or an ICP method.

(Crystal Structure)

In the crystal structure analysis, the analysis can be performed with an X-ray diffractometer using Cu as a target, the identification of the X-ray diffraction patterns can be performed with an appended software by comparing with the known X-ray diffraction patterns obtained from PDF (Powder Diffraction File) of ICDD (International Center For Diffraction Data). Although the titanium-based composite oxide of the present invention is a compound based on Ti, Nb, P and O, the titanium-based composite oxide corresponds, with respect to the X-ray diffraction pattern thereof, to the bronze-structure titanium oxide having a tunnel structure or a layered structure, is monoclinic and belongs to the space group C2/m. The X-ray diffraction patterns of the bronze-structure titanium oxide are represented by PDF #0035-0088, #0046-1237 and #0046-1238.

(Specific Surface Area)

The specific surface area is measured by the BET method, is a parameter representing the magnitude of the reaction interface when the titanium-based composite oxide undergoes the electrode reaction involving the intercalation/deintercalation of lithium ion, and is an important factor at the time of performing rapid charge/discharge. Specifically, the larger is the numerical value of the specific surface area, the more improved is the reactivity; however, when the concerned numerical value is too large, the internal resistance of the battery is increased due to the decrease of the adhesiveness with the electrode current collector or the increase of the interface resistance between the particles, and when the concerned numerical value is too small, the reactivity is decreased and thus no sufficient properties are obtained; thus the specific surface area is preferably controlled to fall within a range from 5 to 50 $m^2/g$.

(Primary Particles and Secondary Particles)

The titanium-based composite oxide allows the observation of the primary particles and the secondary particles thereof with a scanning electron microscope. In general, the primary particle size of the active material, similarly to the specific surface area, represents the reaction interface involving lithium ion and the magnitude of the migration distance of lithium ion, and is one of the important factors controlling the magnitude of the charge/discharge capacity. The smaller is the particle size, the larger is the reaction interface and the shorter is the migration distance of lithium ion, and hence the larger charge/discharge capacity and the higher load properties tend to be obtained. On the other hand, because the electrode of the lithium secondary battery is prepared by coating the current collector with the coating material prepared by mixing the active material with an organic solvent and a binder, when the particle size of the active material is small and the specific surface area of the active material is large, or the particle shape of the active material is an anisotropic shape such as a needle or a rod, it is difficult to prepare a coating material from the active material, and there is a possibility that the coating film is exfoliated from the current collector. Additionally, when the organic solvent is used in a large amount or the proportion of the binder is increased for the purpose of improving the coating material performance, the active material amount per the unit area of the electrode is decreased, and consequently it is impossible to make the most of the high charge/discharge capacity.

The existing bronze-structure titanium oxide is a compound having a high specific surface area obtained by a wet method such as the hydrothermal synthesis method, or a compound obtained by a solid phase method, having a needled shape or a rod shape with a large long axis to short axis ratio, having steric hindrance and being low in bulk density, although having a low specific surface area. The titanium-based composite oxide can be suppressed with respect to the growth of the long axis length by adding a third element, and enables the maximum particle size of the long axis to be 5 μm or less and the average particle size to be 3 μm or less even when the titanium-based composite oxide is a product for which the firing temperature of the intermediate is 1000° C. Further, it is possible to form secondary particles in which rod-shaped particles are aggregated by performing the raw material mixing by a spray dry method or by performing a particle size regulation after compaction molding. The secondary particles are small in steric hindrance, and hence the bulk density can be made to be as high as 0.4 g/ml or more, the coating material made from the secondary particles can be easily regulated to have an appropriate viscosity, and thus a high coating packing density can be realized.

Additionally, the titanium-based composite oxide granulated into spherical shapes or agglomerated shapes can alleviate the volume expansion accompanying charge/discharge, and thus suppresses the damage to the coating film and can contribute to the cycle stability.

(Imparting of Conductivity)

The titanium-based composite oxide of the present invention can also be obtained by performing a heat treatment in a nonoxidative or reductive atmosphere, although usually the heat treatment is performed in the air, in the heat treatment step in which the bronze structure is obtained from a precursor by dehydration; in the case of the nonoxidative or reductive atmosphere, the improvement of the electronic conductivity due to the oxygen deficient structure can be expected. It is also effective to impart the conductivity by coating the surface of the primary particles with carbon. The titanium-based composite oxide of the present invention are obtained by heat treating, in an nonoxidative atmosphere or in a reductive atmosphere, an organic matter and the titanium-based composite oxide or the precursor thereof, are improved in electronic conductivity, and can alleviate the damage due to the expansion and contraction of the particles accompanying the charge/discharge and are effective for the load properties and the cycle stability.

(Battery Properties)

When a coin secondary battery in which the titanium-based composite oxide is used as the positive electrode active material and Li metal is used for the negative electrode is prepared, and a charge/discharge test is performed at 35 mA per 1 g of the active material, the titanium-based composite oxide according to the present invention enables the initial discharge capacity to attain a high value of 210 mAh/g or more. The index for the cycle properties is represented by the retention rate of the discharge capacity at the 50th cycle ($C_{50th\ cycle}$) relative to discharge capacity at the third cycle ($C_{3rd\ cycle}$), namely, the capacity retention rate=$C_{50th\ cycle}/C_{3rd\ cycle} \times 100$, and the capacity retention rate of the coin secondary battery using the active material can attain 95% or more. This corresponds to a charge/discharge capacity higher by about 5 to 30% as compared to the capacity retention rates of the titanium oxide compounds having the equivalent crystallite sizes and the equivalent specific surface areas and not containing niobium and/or phosphorus; the smaller is the specific surface area, the larger is the capacity difference. Although the mechanism in which the capacity is improved by compositing niobium and/or phosphorus with titanium oxide is not clear at present, it is inferred that by partially substituting niobium and/or phosphorus in the tunnel-structure or layered-structure $TiO_6$ framework, the framework is somewhat distorted, and thus the diffusion path of lithium ion is broadened to facilitate the intercalation/deintercalation of lithium ion. Actually, in the bronze-structure titanium oxide obtained by adding niobium and/or phosphorus, the value of the lattice constant a corresponding to the inter-layer distance is maintained to be larger as compared to the case without addition of niobium and/or phosphorus.

(Production Method)

The production method of the titanium-based composite oxide of the present invention is described in detail.

As the titanium raw material, anatase-type titanium oxide and rutile-type titanium oxide, hydrous titanium oxide (metatitanic acid) and titanium hydroxide can be used; however it is preferable to use anatase-type titanium oxide or hydrous titanium oxide, which are satisfactory in the reactivity with auxiliary materials. As the potassium raw material, potassium carbonate or potassium hydroxide can be used; however, potassium carbonate is preferable from the viewpoint of work safety. As the niobium raw material, niobium hydroxide, niobium pentaoxide or potassium niobate can be used. As the phosphorus raw material, phosphoric acid, diphosphorus pentaoxide, potassium phosphate, potassium hydrogen phosphate, potassium metaphosphate, potassium pyrophosphate, potassium hydrogen pyrophosphate or ammonium phosphate can be used.

First, the respective raw materials are mixed together to prepare a raw material mixture. The mixing proportions of the titanium raw material and the potassium raw material are preferably such that these raw materials are mixed together in a range somewhat excessive in potassium with reference to the stoichiometric ratio based on $K_2Ti_4O_9$. This takes account of the volatilization of potassium in the firing step; when the mixing ratio comes to be such that titanium is partially excessive than the stoichiometric ratio, $K_2Ti_6O_{13}$ is produced, the removal of potassium ion comes to be insufficient, and a cause for the charge/discharge capacity decrease is provided. Additionally, niobium or phosphorus also forms a compound with potassium, and hence the amount of potassium is regulated so as to correspond to such compound formation. The mixing method can use a common pulverizing-mixing machine such as a Henschel mixer, a vibration mill, a planet ball mill or an automatic mortar; additionally, the raw materials are mixed and dissolved in water to prepare a slurry, and by drying up the slurry by a method such as spray drying or spray thermal decomposition, a raw material mixture can be prepared. In the latter case of wet mixing of the raw materials, by pulverizing the raw materials all together beforehand with a pulverizing machine such as a ball mill, the reactivity can be increased.

Next, the raw material mixture is fired in the air within a range from 700 to 1100° C. The firing time can be appropriately regulated according to the firing temperature and the feed amount in the furnace. For cooling, spontaneous cooling in the furnace may be adopted or the fired mixture may be allowed to cool after being taken outside the furnace; cooling is not particularly limited. The obtained fired product can be evaluated by identifying the constituting phases by X-ray diffraction; it is preferable that the main component is the layered-structure $K_2Ti_4O_9$, which is monoclinic and belongs to the space group C2/m. However, depending on the addition of the element niobium and/or the element phosphorus, the diffraction lines ascribable to the by-products are included to some extent. When the $K_2Ti_6O_{13}$ phase, the $K_2Ti_2O_5$ phase or both of these phases occur, by pulverizing the fired product with a pulverizing machine such as a vibration mill, a hammer mill or an automatic mortar, and by again firing the pulverized product in the air, the amount of the by-products, $K_2Ti_6O_{13}$ and $K_2Ti_2O_5$, can be reduced.

The fired product is pulverized, where necessary, with a common pulverizing machine such as a vibration mill, a hammer mill or a jet mill, then the pulverized product is immersed to perform ion exchange in one or combinations of two or more selected from 0.1N to 5N sulfuric acid, hydrochloric acid and nitric acid. This ion exchange treatment is performed within a range from 1 hour to 1 week, and then the extraneous salts are removed by decantation, filter pressing or the like. By performing the ion exchange two or more times, potassium ion can be effectively removed. After the removal of the extraneous salts, solid-liquid separation is performed with a filter press or a centrifugal separator, the resulting solid product is dried at 100° C. or higher, and thus the precursor of the titanium-based composite oxide is obtained.

By heat treating the precursor at 300 to 700° C. and more preferably within a range from 400 to 600° C., in the air or in a nitrogen atmosphere, the titanium-based composite oxide is obtained. The heat treatment time can be appropriately regulated according to the firing temperature and the feed amount in the furnace. For cooling, spontaneous cooling in the furnace may be adopted or the heat treated product may be allowed to cool after being taken outside the furnace; cooling is not particularly limited.

The coating with carbon can be performed at the stage, midway through the step, where the precursor of the titanium-based composite oxide or the titanium-based composite oxide is obtained. A carbon-containing organic material is dry mixed with the precursor or the titanium-based composite oxide, or the precursor or the titanium-based composite oxide is again placed together with the organic material in water and spray dried with a spray dryer, and thus a mixture of the organic material and the precursor or the titanium-based composite oxide can be prepared. As the organic material, all the organic material composed of carbon, or carbon, hydrogen and oxygen can be used; however, when the mixing is performed with a method such as a spray dry method, preferable are water-soluble saccharides such as glucose and maltose and water-soluble alcohols such as PVA. By carbonizing the mixture by decomposition by heating at 500 to 800° C. in a nonoxidative atmosphere, the titanium-based composite oxide can be uniformly coated with carbon. When the precursor is used, the heat treatment for obtaining the titanium-based composite oxide and the carbonization can be performed simultaneously, and hence the simplification of the step is made possible.

EXAMPLES

Hereinafter, the present invention is described in more detail with reference to Examples. Following Examples are described merely for the purpose of exemplifying the present invention, and the scope of the present invention is not limited by these Examples.

Example 1

Potassium carbonate powder, titanium dioxide powder and niobium hydroxide powder were weighed out so as to satisfy the molar ratio of K:Ti:Nb=34:62:4, and were mixed and dissolved in deionized water to prepare a raw material mixed slurry. The resulting slurry was spray dried by using a spray dryer, and was fired in a box-type electric furnace at 850° C. for 1 hour. The fired product was stirred for 15 hours in an aqueous solution of 3.6N $H_2SO_4$ to exchange potassium ion with proton, and then the extraneous salts were removed by decantation washing. The proton exchange and the decantation washing were each performed twice. Solid-liquid separation was performed with a Buchner funnel with a filter paper placed therein, and the resulting solid product was dried at 110° C. for 24 hours. The dried product was heat treated in a box-type electric furnace at 400° C. to yield the sample 1.

The obtained sample was subjected to X-ray diffraction pattern measurement with an X-ray diffractometer (trade name: RINT-TTR III, manufactured by Rigaku Corp.) and was verified to be of a single phase composed of the bronze-structure titanium oxide being monoclinic and belonging to the space group C2/m. The content of niobium was measured with an X-ray fluorescence spectrometer, model Simultix 10, manufactured by Rigaku Corp., and the composition was verified to be represented by $Ti_{0.94}Nb_{0.06}O_{2.03}$. The specific surface area based on the BET one-point method was measured with the Gemini 2375 manufactured by Micromeritics Inc. and the specific surface area was found to be 25 $m^2/g$.

After 82 parts by weight of the sample, 9 parts by weight of acetylene black and 9 parts by weight of polyvinylidene fluoride were mixed together to prepare a mixed sample, then the mixed sample was added to N-methyl-2-pyrrolidone so as for the solid content concentration to be 30%, and the resulting mixture was kneaded for 5 minutes with a high share mixer to prepare a coating material. Next, the coating material was applied to a copper foil by a doctor blade method. After drying in vacuo at 110° C., this electrode composite was roll-pressed into 80% of its initial thickness. The roll-pressed electrode sheet was punched into a circle having an area of 1 $cm^2$, and was used as the positive electrode of the coin battery illustrated in FIG. 1. In FIG. 1, a lithium metal plate was used for the negative electrode, a solution prepared by dissolving $LiPF_6$ in a concentration of 1 mol/L in an equivalent volume mixture of ethylene carbonate and dimethyl carbonate was used as the electrolyte, and a glass filter was used as the separator. By using the coin battery prepared as described above, the battery was discharged to 1.0 V at 35 mA per 1 g of the active material, then charged to 3.0 V at the same current value, and this cycle was repeated 50 times. In the measurement environment, the temperature was set at 25° C. The initial discharge capacity was 247 mAh/g and the discharge capacity at the third cycle was 226 mAh/g. A satisfactory cycle stability was displayed in such a way that the discharge capacity after the 50th cycle was 217 mAh/g and the cycle capacity retention rate at the 50th cycle relative to the third cycle was 96%.

Example 2

The sample 2 was prepared in the same manner as in Example 1 except that the temperature of the firing after the raw material mixing was set at 1000° C. It was verified that the obtained sample was of a single phase composed of the bronze-structure titanium oxide being monoclinic and belonging to the space group C2/m, and the composition thereof was represented by $Ti_{0.94}Nb_{0.06}O_{2.03}$. The specific surface area was 15 $m^2/g$. The initial discharge capacity was 231 mAh/g, and the discharge capacity at the third cycle was 210 mAh/g. The discharge capacity at the 50th cycle was 210 mAh/g, and the capacity retention rate at the 50th cycle was 99% or more.

Example 3

The sample 3 was prepared in the same manner as in Example 1 except that the temperature of the firing after the raw material mixing was set at 1050° C. It was verified that the obtained sample was of a single phase composed of the bronze-structure titanium oxide having a crystal structure being monoclinic and belonging to the space group C2/m, and the composition thereof was represented by $Ti_{0.94}Nb_{0.06}O_{2.03}$. The specific surface area was 10 $m^2/g$. The initial discharge capacity was 216 mAh/g, and the discharge capacity at the third cycle was 199 mAh/g. The discharge capacity at the 50th cycle was 199 mAh/g, and the capacity retention rate at the 50th cycle was 99% or more.

Example 4

The sample 4 was prepared in the same manner as in Example 2 (the temperature of the firing after the raw material mixing was 1000° C.) except that in the raw material mixing, the mixing ratio between potassium carbonate powder, titanium dioxide powder and niobium hydroxide powder was set so as to satisfy the molar ratio of K:Ti:Nb=34:65:1. It was verified that the obtained sample was of a single phase composed of the bronze-structure titanium oxide being monoclinic and belonging to the space group C2/m, and the composition thereof was represented by $Ti_{0.99}Nb_{0.01}O_{2.00}$. The specific surface area was 15 $m^2/g$. The initial discharge capacity was 220 mAh/g, and the discharge capacity at the third cycle was 198 mAh/g. The discharge capacity at the 50th cycle was 195 mAh/g, and the capacity retention rate at the 50th cycle was 99%.

Example 5

The sample 5 was prepared in the same manner as in Example 2 (the temperature of the firing after the raw material mixing was 1000° C.) except that in the raw material mixing, the mixing ratio between potassium carbonate powder, titanium dioxide powder and niobium hydroxide powder was set so as to satisfy the molar ratio of K:Ti:Nb=34:59:7. It was verified that the obtained sample was of a single phase composed of the bronze-structure titanium oxide being monoclinic and belonging to the space group C2/m, and the composition thereof was represented by $Ti_{0.90}Nb_{0.10}O_{2.05}$. The specific surface area was 12 m$^2$/g. The initial discharge capacity was 217 mAh/g, and the discharge capacity at the third cycle was 197 mAh/g. The discharge capacity at the 50th cycle was 194 mAh/g, and the capacity retention rate at the 50th cycle was 99%.

Example 6

The sample 6 was prepared in the same manner as in Example 1 (the temperature of the firing after the raw material mixing was 850° C.) except that in the raw material mixing, the mixing ratio between potassium carbonate powder, titanium dioxide powder and niobium hydroxide powder was set so as to satisfy the molar ratio of K:Ti:Nb=34:57:9. It was verified that the obtained sample was of a single phase composed of the bronze-structure titanium oxide being monoclinic and belonging to the space group C2/m, and the composition thereof was represented by $Ti_{0.87}Nb_{0.13}O_{2.06}$. The specific surface area was 23 m$^2$/g. The initial discharge capacity was 215 mAh/g, and the discharge capacity at the third cycle was 195 mAh/g. The discharge capacity at the 50th cycle was 187 mAh/g, and the capacity retention rate at the 50th cycle was 96%.

Example 7

The sample 7 was prepared in the same manner as in Example 1 (the temperature of the firing after the raw material mixing was 850° C.) except that in the raw material mixing, potassium pyrophosphate was mixed in place of niobium hydroxide so as for the mixing ratio to satisfy the molar ratio of K:Ti:P=34:65:1. It was verified that the obtained sample was of a single phase composed of the bronze-structure titanium oxide being monoclinic and belonging to the space group C2/m, and the composition thereof was represented by $Ti_{0.994}P_{0.006}O_{2.003}$. The specific surface area was 28 m$^2$/g. The initial discharge capacity was 241 mAh/g, and the discharge capacity at the third cycle was 217 mAh/g. The discharge capacity at the 50th cycle was 208 mAh/g, and the capacity retention rate at the 50th cycle was 96%.

Example 8

The sample 8 was prepared in the same manner as in Example 2 (the temperature of the firing after the raw material mixing was 1000° C.) except that in the raw material mixing, potassium pyrophosphate was mixed in place of niobium hydroxide so as for the mixing ratio to satisfy the molar ratio of K:Ti:P=34:65:1. It was verified that the obtained sample was of a single phase composed of the bronze-structure titanium oxide being monoclinic and belonging to the space group C2/m, and the composition thereof was represented by $Ti_{0.994}P_{0.006}O_{2.003}$. The specific surface area was 15 m$^2$/g. The initial discharge capacity was 214 mAh/g, and the discharge capacity at the third cycle was 198 mAh/g. The discharge capacity at the 50th cycle was 196 mAh/g, and the capacity retention rate at the 50th cycle was 99%.

Example 9

The sample 9 was prepared in the same manner as in Example 2 (the temperature of the firing after the raw material mixing was 1000° C.) except that in the raw material mixing, potassium carbonate powder, titanium oxide powder, niobium hydroxide powder and potassium pyrophosphate power were mixed so as for the mixing ratio to satisfy the molar ratio of K:Ti:Nb:P=34:64:1.5:0.5. It was verified that the obtained sample was of a single phase composed of the bronze-structure titanium oxide being monoclinic and belonging to the space group C2/m, and the composition thereof was represented by $Ti_{0.953}Nb_{0.041}P_{0.006}O_{2.023}$. The specific surface area was 14 m$^2$/g. The initial discharge capacity was 224 mAh/g, and the discharge capacity at the third cycle was 202 mAh/g. The discharge capacity at the 50th cycle was 200 mAh/g, and the capacity retention rate at the 50th cycle was 99%.

Comparative Example 1

The sample 10 was prepared in the same manner as in Example 1 (the temperature of the firing after the raw material mixing was 850° C.) except that in the raw material mixing, niobium hydroxide was not added. It was verified that the obtained sample was of a single phase composed of the bronze-structure titanium oxide being monoclinic and belonging to the space group C2/m, and the composition thereof was represented by $TiO_2$. The specific surface area was 25 m$^2$/g. The initial discharge capacity was 228 mAh/g, and the discharge capacity at the third cycle was 210 mAh/g. The discharge capacity at the 50th cycle was 195 mAh/g, and the capacity retention rate at the 50th cycle was 93%.

Comparative Example 2

The sample 11 was prepared in the same manner as in Example 2 (the temperature of the firing after the raw material mixing was 1000° C.) except that in the raw material mixing, niobium hydroxide was not added. It was verified that the obtained sample was of a single phase composed of the bronze-structure titanium oxide being monoclinic and belonging to the space group C2/m, and the composition thereof was represented by $TiO_2$. The specific surface area was 13 m$^2$/g. The initial discharge capacity was 209 mAh/g, and the discharge capacity at the third cycle was 192 mAh/g. The discharge capacity at the 50th cycle was 190 mAh/g, and the capacity retention rate at the 50th cycle was 99% or more.

Comparative Example 3

The sample 12 was prepared in the same manner as in Example 3 (the temperature of the firing after the raw material mixing was 1050° C.) except that in the raw material mixing, niobium hydroxide was not added. It was verified that the obtained sample was of a single phase composed of titanium oxide having a crystal structure being monoclinic and belonging to the space group C2/m, and the composition thereof was represented by $TiO_2$. The specific surface area was 9 m$^2$/g. The initial discharge capacity was 184 mAh/g, and the discharge capacity at the third cycle was 158 mAh/g. The discharge capacity at the 50th cycle was 160 mAh/g, and the capacity retention rate at the 50th cycle was 99% or more.

Comparative Example 4

The sample 13 was prepared in the same manner as in Example 2 except that in the raw material mixing, the raw material mixing ratio between potassium carbonate powder, titanium dioxide powder and niobium hydroxide powder was set so as to satisfy the molar ratio of K:Ti:Nb=34:54:12. It was verified that the obtained sample was of two phases, namely, one phase composed of TiO$_2$ having a crystal structure being monoclinic and belonging to the space group C2/m and the other phase composed of KNbO$_3$. The composition was verified to be represented by Ti$_{0.83}$Nb$_{0.17}$O$_{2.08}$. The specific surface area was 7 m$^2$/g. The initial discharge capacity was 180 mAh/g, and the discharge capacity at the third cycle was 147 mAh/g. The discharge capacity at the 50th cycle was 147 mAh/g, and the capacity retention rate at the 50th cycle was 99% or more.

Comparative Example 5

The sample 14 was prepared in the same manner as in Example 3 (the temperature and time of the firing after the raw material mixing was 1050° C. and 1 hour, respectively) except that the time of the firing after the raw material mixing was 24 hours. It was verified that the obtained sample was of a single phase composed of titanium oxide having a crystal structure being monoclinic and belonging to the space group C2/m, and the composition thereof was represented by Ti$_{0.94}$Nb$_{0.06}$O$_{2.03}$. The specific surface area was 3 m$^2$/g. The initial discharge capacity was 178 mAh/g, and the discharge capacity at the third cycle was 117 mAh/g. The discharge capacity at the 50th cycle was 94 mAh/g, and the capacity retention rate at the 50th cycle was 80%.

Comparative Example 6

The sample 15 was prepared in the same manner as in Example 2 (the temperature of the firing after the raw material mixing was 1000° C.) except that the in the raw material mixing, the raw material mixing ratio between potassium carbonate powder, titanium dioxide powder and niobium hydroxide powder was set so as to satisfy the molar ratio of K:Ti:Nb=38:58:4. It was verified that the obtained sample was of a single phase composed of titanium oxide having a crystal structure being monoclinic and belonging to the space group C2/m, and the composition thereof was represented by Ti$_{0.94}$Nb$_{0.06}$O$_{2.03}$. The specific surface area was 55 m$^2$/g. The initial discharge capacity was 205 mAh/g, and the discharge capacity at the third cycle was 180 mAh/g. The discharge capacity at the 50th cycle was 175 mAh/g, and the capacity retention rate at the 50th cycle was 97%.

The results for above-described Examples and Comparative Examples are shown in Table 1.

TABLE 1

| | Sample No. | Specific surface area (m$^2$/g) | Composition Ti$_{(1-x)}$M$_x$O$_y$ M | x | y | Discharge capacity First cycle (mAh/g) | Discharge capacity Third cycles (mAh/g) | Capacity retention rate (%) |
|---|---|---|---|---|---|---|---|---|
| Example 1 | Sample 1 | 25 | Nb | 0.06 | 2.03 | 247 | 226 | 96 |
| Example 2 | Sample 2 | 15 | Nb | 0.06 | 2.03 | 231 | 210 | >99 |
| Example 3 | Sample 3 | 10 | Nb | 0.06 | 2.03 | 216 | 199 | >99 |
| Example 4 | Sample 4 | 15 | Nb | 0.01 | 2.00 | 220 | 198 | 99 |
| Example 5 | Sample 5 | 12 | Nb | 0.10 | 2.05 | 217 | 197 | 99 |
| Example 6 | Sample 6 | 23 | Nb | 0.13 | 2.06 | 215 | 195 | 96 |
| Example 7 | Sample 7 | 28 | P | 0.006 | 2.00 | 241 | 217 | 96 |
| Example 8 | Sample 8 | 15 | P | 0.006 | 2.00 | 214 | 198 | 99 |
| Example 9 | Sample 9 | 14 | Nb P | 0.041 0.006 | 2.02 | 224 | 202 | 99 |
| Comparative Example 1 | Sample 10 | 25 | — | — | 2.00 | 228 | 210 | 93 |
| Comparative Example 2 | Sample 11 | 13 | — | — | 2.00 | 209 | 192 | 99 |
| Comparative Example 3 | Sample 12 | 9 | — | — | 2.00 | 184 | 158 | >99 |
| Comparative Example 4 | Sample 13 | 7 | Nb | 0.17 | 2.08 | 180 | 147 | 99 |
| Comparative Example 5 | Sample 14 | 3 | Nb | 0.06 | 2.03 | 178 | 117 | 80 |
| Comparative Example 6 | Sample 15 | 55 | Nb | 0.06 | 2.03 | 205 | 180 | 97 |

What is claimed is:

1. A titanium-based composite oxide represented by the chemical formula of Ti$_{(1-x)}$M$_x$O$_y$,
    wherein M is elemental Nb or elemental P, or a combination of these two elements in an optional ratio therebetween, x is represented as 0<x<0.17, y is represented as 2.0≤y≤2.1, in the proviso that when M is a combination of elemental Nb and elemental P, x is the sum of the molar proportions of Nb and P, and
    wherein the crystal structure of the titanium-based composite oxide comprises a tunnel structure or a layered structure, is monoclinic, belongs to a space group C2/m, and has a diffraction pattern based on the powder X-ray diffraction corresponding to the bronze structure.

2. The titanium-based composite oxide according to claim 1, wherein the specific surface area is in a range from 5 m$^2$/g to 50 m$^2$/g.

3. An electrode for use in a battery,
    the electrode using as the electrode active material a titanium-based composite oxide represented by the chemical formula of Ti$_{(1-x)}$M$_x$O$_y$,
    wherein M is elemental Nb or elemental P, or a combination of these two elements in an optional ratio therebetween, x is represented as 0<x<0.17, y is represented as 2.0≤y≤2.1, in the proviso that when M is a combination of elemental Nb and elemental P, x is the sum of the molar proportions of Nb and P, and
    wherein the crystal structure of the titanium-based composite oxide comprises a tunnel structure or a layered structure, is monoclinic, belongs to a space group C2/m, and has a diffraction pattern based on the powder X-ray diffraction corresponding to the bronze structure.

4. The electrode for use in a battery according to claim 3, wherein the specific surface area of the titanium-based composite oxide is in a range from 5 m$^2$/g to 50 m$^2$/g.

5. A lithium secondary battery comprising
an electrode using as the electrode active material a titanium-based composite oxide represented by the chemical formula of $Ti_{(1-x)}M_xO_y$,
wherein M is elemental Nb or elemental P, or a combination of these two elements in an optional ratio therebetween, x is represented as $0<x<0.17$, y is represented as $2.0 \leq y \leq 2.1$, in the proviso that when M is a combination of elemental Nb and elemental P, x is the sum of the molar proportions of Nb and P, and
wherein the crystal structure of the titanium-based composite oxide comprises a tunnel structure or a layered structure, is monoclinic, belongs to a space group C2/m, and has a diffraction pattern based on the powder X-ray diffraction corresponding to the bronze structure.

6. The lithium secondary battery according to claim 5, wherein the specific surface area of the titanium-based composite oxide is in a range from 5 m$^2$/g to 50 m$^2$/g.

7. The coin lithium secondary battery according to claim 5, wherein when Li metal is used as a counter electrode which is for the negative electrode, at 35 mA per 1 g of the positive electrode active material, the initial discharge capacity that is Li intercalation capacity is 210 mAh/g or more, the discharge capacity that is Li intercalation capacity at the third cycle is 195 mAh/g or more, and the retention rate of the discharge capacity at the 50th cycle relative to the discharge capacity at the third cycle is 95% or more.

* * * * *